(12) United States Patent
Sato et al.

(10) Patent No.: US 7,056,621 B2
(45) Date of Patent: Jun. 6, 2006

(54) ALKALINE STORAGE BATTERY

(75) Inventors: Naoto Sato, Kosai (JP); Nobuyasu Morishita, Toyohashi (JP)

(73) Assignees: Matsushita Electric Industrial Co., Ltd., Osaka (JP); Toyota Jidosha Kabushiki Kaisha, Toyota (JP)

( * ) Notice: Subject to any disclaimer, the term of this patent is extended or adjusted under 35 U.S.C. 154(b) by 202 days.

(21) Appl. No.: 10/293,183

(22) Filed: Nov. 12, 2002

(65) Prior Publication Data

US 2003/0091906 A1 May 15, 2003

(30) Foreign Application Priority Data

Nov. 12, 2001 (JP) ............................. 2001-346232
Sep. 2, 2002 (JP) ............................. 2002-256961

(51) Int. Cl.
*H01M 4/02* (2006.01)
(52) U.S. Cl. ....................... 429/209; 429/347; 429/206
(58) Field of Classification Search ................ 429/347, 429/209, 206, 218.1, 223, 248
See application file for complete search history.

(56) References Cited

U.S. PATENT DOCUMENTS

| | | | | |
|---|---|---|---|---|
| 6,013,390 A | * | 1/2000 | Kimiya et al. | 429/206 |
| 6,077,628 A | * | 6/2000 | Takechi et al. | 429/200 |
| 6,136,473 A | * | 10/2000 | Furukawa et al. | 429/218.2 |
| 6,811,927 B1 | * | 11/2004 | Urairi et al. | 429/248 |
| 2002/0172870 A1 | * | 11/2002 | Urairi et al. | 429/249 |
| 2003/0008209 A1 | * | 1/2003 | Rahim et al. | 429/176 |

FOREIGN PATENT DOCUMENTS

| EP | 0 867 959 A2 | 9/1998 |
|---|---|---|
| EP | 0 996 182 A1 | 4/2000 |
| EP | 1 130 666 A2 | 9/2001 |
| JP | 1-132044 | 5/1989 |
| JP | 9-92279 | * 4/1997 |

* cited by examiner

*Primary Examiner*—Laura Weiner
(74) *Attorney, Agent, or Firm*—Hamre, Schumann, Mueller & Larson, P.C.

(57) ABSTRACT

An alkaline storage battery includes a positive electrode, a negative electrode, a separator, and an alkaline electrolyte retained in the positive electrode, the negative electrode, and the separator. The alkaline storage battery further includes a first compound for adsorbing ammonia between the positive electrode and the negative electrode. The positive electrode comprises a second compound for increasing oxygen overvoltage at a time of overcharge. Thus, an alkaline storage battery with particularly little self-discharge can be provided.

5 Claims, 5 Drawing Sheets

ALKALINE STORAGE BATTERY

BACKGROUND OF THE INVENTION

1. Field of the Invention

The present invention relates to alkaline storage batteries.

2. Description of the Related Art

In recent years, alkaline storage batteries have been used as power sources for portable information equipment such as cellular phones and notebook computers, electric cars, or hybrid vehicles, and there has been a demand for high performance, in particular long life of alkaline storage batteries. In particular, for batteries for electric cars, it is considered that they are left unused for a long time, so that in order to prevent the start-up properties of an engine from deteriorating after being left unused, there is a strong demand for batteries with little self-discharge.

On the other hand, in alkali storage batteries such as nickel/metal-hydride (Ni/MH) storage batteries, self-discharge is suppressed by performing a specific treatment for providing hydrophilicity such as a sulfonation treatment with respect to a separator (e.g., JP 1-132044 A).

However, for use in a power source of an electric car, self-discharge should be suppressed further. In addition, the costs of sulfonation treatment are high.

On the other hand, as a method for providing hydrophilicity at low cost, and corona discharge is used, for example. However, this method has a problem in that the self-discharge characteristics are poorer that those of a separator that has been subjected to a sulfonation treatment.

SUMMARY OF THE INVENTION

Therefore, with the foregoing in mind, it is an object of the present invention to provide an alkaline storage battery with particularly little self-discharge.

An alkaline storage battery of the present invention includes a positive electrode, a negative electrode, a separator and an alkaline electrolyte retained in the positive electrode, the negative electrode and the separator. The alkaline storage battery further comprises a first compound for adsorbing ammonia between the positive electrode and the negative electrode. The positive electrode comprises a second compound for increasing oxygen overvoltage at the time of overcharge. In this alkaline storage battery, a self-discharge reaction is suppressed by the compound for adsorbing ammonia, so that an alkaline storage battery with particularly little self-discharge can be obtained. In addition, since the positive electrode includes the second compound for increasing oxygen overvoltage at the time of overcharge, carbodiimide groups are prevented from being oxidized by oxygen, and a synergistic effect also is present, although the reason for this is not clear, so that an alkaline storage battery having good life characteristics can be obtained.

In the alkaline storage battery, the first compound may include carbodiimide groups, and the carbodiimide groups may be present in the amount of $1.0 \times 10^{-6}$ mol or more per Ah of the theoretical capacity of the positive electrode between the positive electrode and the negative electrode.

In the alkaline storage battery, the first compound may be contained in the form of powder, and the average particle size of the powder may be 0.1 μm or more and 100 μm or less.

In the alkaline storage battery, the positive electrode may contain at least one compound selected from the group consisting of yttrium compounds, indium compounds, antimony compounds, beryllium compounds and ytterbium compounds as the second compound.

In the alkaline storage battery, the positive electrode may contain at least one compound selected from the group consisting of $Y_2O_3$, $Y(OH)_3$, $In_2O_3$, $In_2O$, $In_2O_3 \cdot H_2O$, $Sb_2O_3$, $Sb_2O_4$, BeO, $Be(OH)_2$, $Yb_2O3$ and $Yb(OH)_3$ as the second compound.

In the alkaline storage battery, the amount X (g) of the second compound contained in the positive electrode and the amount Y (g) of an active material contained in the positive electrode may satisfy $0.001 \leq X/Y \leq 0.05$.

DESCRIPTION OF THE PREFERRED EMBODIMENTS

Hereinafter, an embodiment of the present invention will be described with reference to the accompanying drawings.

Figure 1:
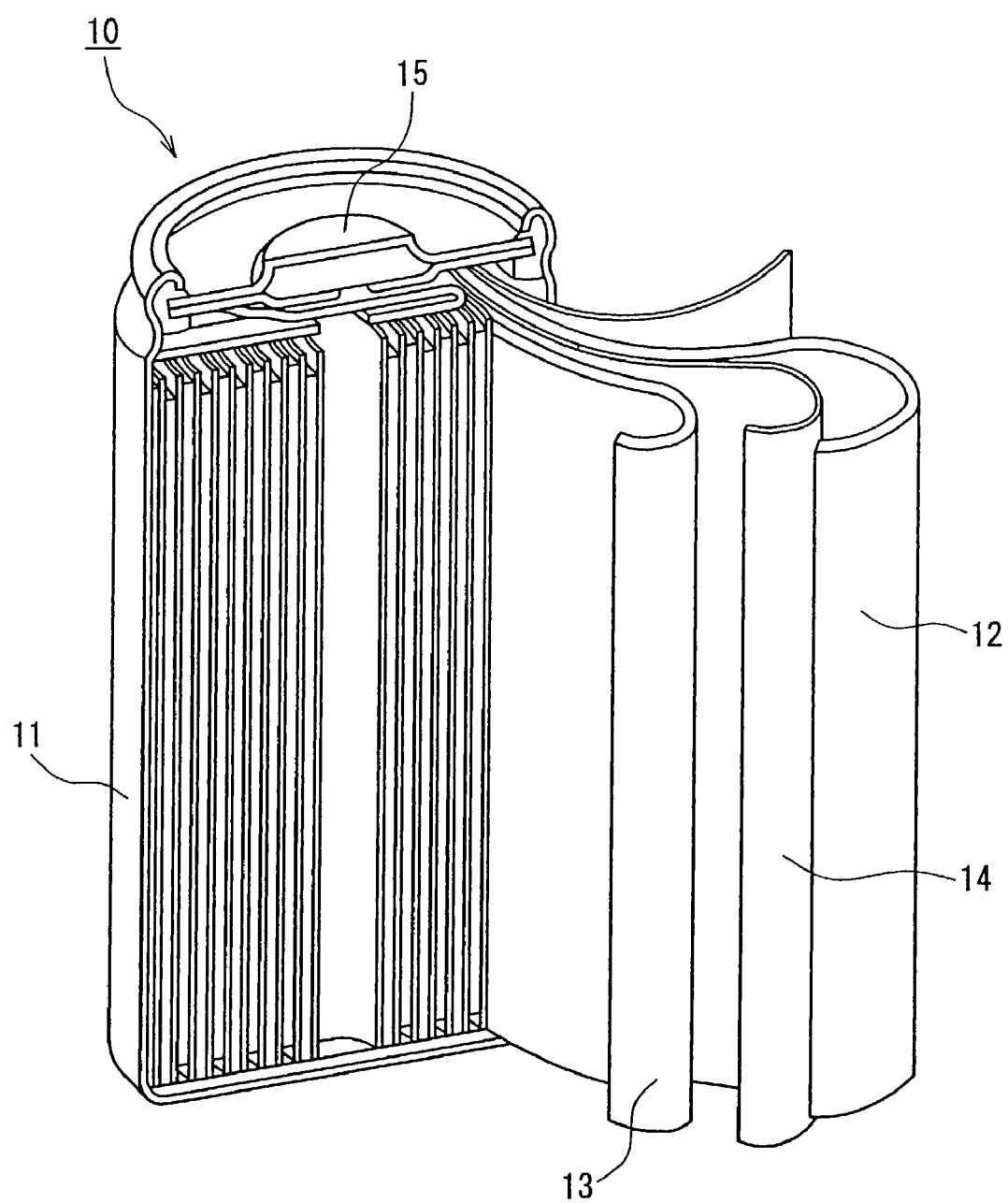
FIG. 1 is a partially exploded perspective view schematically showing an example of an alkaline storage battery of the present invention.

FIG. 1 (hatching is omitted) is a partially exploded perspective view schematically showing an alkaline storage battery 10, which is an example of the alkaline storage battery of the present invention. The alkaline storage battery 10 includes a case 11, a positive electrode 12 enclosed in the case 11, a negative electrode 13, a separator 14 disposed between the positive electrode 12 and the negative electrode 13, an electrolyte (not shown), and a sealing plate 15 provided with a safety valve. The electrolyte is retained in the positive electrode plate 12, the negative electrode plate 13 and the separator 14. The alkaline storage battery 10 further includes a compound (first compound, not shown) for adsorbing ammonia that is disposed between the positive electrode 12 and the negative electrode 13. The positive electrode 12 includes a substance (second compound) for increasing oxygen overvoltage at the positive electrode at the time of overcharge.

As the compound for adsorbing ammonia, a high molecular compound (hereinafter, referred to as "compound A" in some cases) containing a carbodiimide group (—N═C═N—) can be used. More specifically, a compound expressed by the following general formula (1) can be used. This compound is terminated with a commonly used atom or atomic group. For example, when it is terminated with hydrogen, the ends are $R^1$—H and $R^2$—H.

$$(R^1-N=C=N-R^2)_n \qquad (1)$$

where n is, for example, in the range from 50 to 5000. $R^1$ and $R^2$ can be the same or different. For $R^1$ and $R^2$, for example, an aliphatic hydrocarbon group or an aromatic hydrocarbon group can be used, for example. More specifically, as a combination of $R^1/R^2$, a phenylene group ($-C_6H_4-$)/phenylene group, phenylene group/methylene group ($-CH_2-$), methylene group/methylene group or the like can be used. A compound obtained as a result of removing $R^2$ from the compound of the general formula (1) also can be used. More specifically, compounds expressed by the following general formula (2) can be used.

 (2)

where the same substances as described above can be used for $R^1$ and n is, for example, in the range from 50 to 5000. The compound expressed by the general formula (2) is terminated with a commonly used atom or atomic group (e.g., hydrogen).

For the carbodiimide groups contained in the compound A, it is preferable that $1.0\times10^{-6}$ mol or more, more preferably $1.0\times10^{-5}$ mol or more, and most preferably $1.0\times10^{-4}$ mol or more, of the carbodiimide groups are provided per Ah of the theoretical capacity of the positive electrode 12 between the positive electrode 12 and the negative electrode 13. In order to dispose the compound A, for example, powder of the compound A is dispersed on the surface of the positive electrode 12, and then the separator 14 is sandwiched by the positive electrode 12 and the negative electrode 13 and they are rolled up. However, not only this method, but also any other methods can be used, as long as the compound A is disposed between the positive electrode 12 and the negative electrode 13 while being dispersed.

When the alkaline storage battery 10 contains the compound A in the form of powder, it is preferable that the average particle size of the powder is 0.1 µm or more and 100 µm or less (more preferably, 0.5 µm or more and 50 µm or less). For example, powder having a particle size of 0.1 µm or more and 100 µm or less can be used. If powder having a particle size of 0.1 µm or more is used, an increase in the internal pressure of the battery due to clogging of the separator can be prevented. If powder having a particle size of 100 µm or less is used, a sufficient effect of suppressing self-discharge can be obtained.

The same positive electrode as used for a commonly used alkaline storage battery can be used for the positive electrode 12, except that the positive electrode 12 includes a substance (second compound, referred to as a substance B in some cases in the following) for increasing oxygen overvoltage at the time of overcharge. More specifically, a positive electrode containing nickel hydroxide as an active material can be used.

As the substance B contained in the positive electrode 12, at least one compound selected from the group consisting of yttrium compounds, indium compounds, antimony compounds, beryllium compounds and ytterbium compounds can be used. More specifically, as the substance B, at least one compound selected from the group consisting of $Y_2O_3$, $Y(OH)_3$, $In_2O_3$, $In_2O$, $In_2O_3 \cdot H_2O$, $Sb_2O_3$, $Sb_2O_4$, BeO, $Be(OH)_2$, $Yb_2O_3$ and $Yb(OH)_3$ can be used. Among these, $Y_2O_3$, which has the largest effect, is preferable. The positive electrode 12 containing the substance B can be obtained by producing a positive electrode with an active material paste for a positive electrode containing the substance B.

It is preferable that the amount X (g) of the substance B (second compound) contained in the positive electrode 12 and the amount Y (g) of the active material (nickel hydroxide) contained in the positive electrode 12 satisfy $0.001 \leq X/Y \leq 0.05$.

When the alkaline storage battery 10 is a nickel-hydrogen storage battery, a positive electrode plate containing nickel hydroxide as an active material is used for the positive electrode plate 12, and a negative electrode plate containing a hydrogen-absorbing alloy as a main component can be used for the negative electrode plate 13. For the electrolyte, an alkaline electrolyte containing potassium hydroxide as a main solute can be used. When the alkaline storage battery 10 is a nickel-cadmium storage battery, a negative electrode plate employing cadmium is used for the negative electrode plate 13, which is the difference from the case of the nickel-hydrogen storage battery.

For the separator 14, a separator that commonly is used for alkaline storage batteries can be used. More specifically, a separator made of a resin obtained by treating polyolefin resin such as polypropylene or polyethylene so as to be hydrophilic can be used. A sulfonation treatment, graft polymerization, a plasma treatment, a corona discharge treatment, a fluoridization treatment or the like can be used to let polyolefin resin be hydrophilic.

For the electrolyte, an electrolyte that commonly is used for alkaline storage batteries can be used. More specifically, an alkaline aqueous solution containing potassium hydroxide or lithium hydroxide as a solute can be used.

The cylindrical alkaline storage battery 10 shown in FIG. 1 is only an example, and the form of the alkaline storage battery of the present invention is not limited to that shown in FIG. 1. For example, the alkaline storage battery of the present invention can be applied to those having other forms than a cylindrical shape, such as a rectangular shape In regular alkaline storage batteries, the charge amount is reduced even if they are not used. This is because self-discharge occurs between the positive electrode and the negative electrode through the medium of a nitrogen compound such as ammonia (shuttle mechanism). In the alkaline storage battery of the present invention, it is believed that self-discharge can be suppressed by the fact that a high molecular compound (e.g., compound A) having ammonia adsorbing properties adsorbs ammonia. Therefore, it is preferable that the number of the compounds or the functional groups having ammonia adsorbing properties contained in the alkaline storage battery of the present invention is larger than that of nitrogen compounds that contribute to a shuttle mechanism. With this constitution, all the nitrogen compounds other than ammonia can be adsorbed onto the compound having ammonia adsorbing properties when they are converted into ammonia, and therefore self-discharge particularly can be suppressed.

EXAMPLES

Hereinafter, the present invention will be described more specifically by way of example.

Example 1

In Example 1, an example of a nickel-hydrogen storage battery that was produced using diphenyl carbodiimide polymer (expressed by chemical formula $H-(C_6H_4-N=C=N-C_6H_4)_n-H$, n=250) as the compound A will be described.

First, an active material paste containing nickel hydrogen was filled in nickel foam, dried, compressed, and cut so as to produce a positive electrode. Similarly, a paste containing a hydrogen-absorbing alloy was applied onto a conductive support, dried, compressed, and cut so as to produce a negative electrode. As the separator, a separator made of polyolefin resin that had been subjected to a sulfonation treatment or a corona discharge treatment was prepared.

Then, powder (particle size of 10 µm) of diphenyl carbodiimide polymer was dispersed on one surface of the positive electrode. Then, the separator and the negative electrode were placed on top of the surface of the positive electrode and were rolled up, and then inserted into the case. Thus, the separator and the powder of diphenyl carbodiimide were disposed between the positive electrode and the negative electrode.

Thereafter, an electrolyte was poured into the case and the case was sealed with a sealing plate. Thus, a nickel-hydrogen storage battery whose positive electrode has a theoretical capacity of 6.5 Ah was obtained. For the electrolyte, an electrolyte containing potassium hydroxide as a main solute and having a relative density of about 1.3 was used.

In Example 1, eight samples having different amounts of diphenyl carbodiimide added and different methods for providing hydrophilicity were produced. Table 1 shows the amount of the carbodiimide groups added and the method for providing hydrophilicity with respect to each sample.

TABLE 1

| Sample | Method for providing hydrophilicity | Amount of carbodiimide groups added [mol/Ah] |
|---|---|---|
| A | Sulfonation treatment | 0 |
| B | | $1.0 \times 10^{-8}$ |
| C | | $1.0 \times 10^{-6}$ |
| D | | $1.0 \times 10^{-4}$ |
| E | Corona discharge treatment | 0 |
| F | | $1.0 \times 10^{-8}$ |
| G | | $1.0 \times 10^{-6}$ |
| H | | $1.0 \times 10^{-4}$ |

Figure 2:
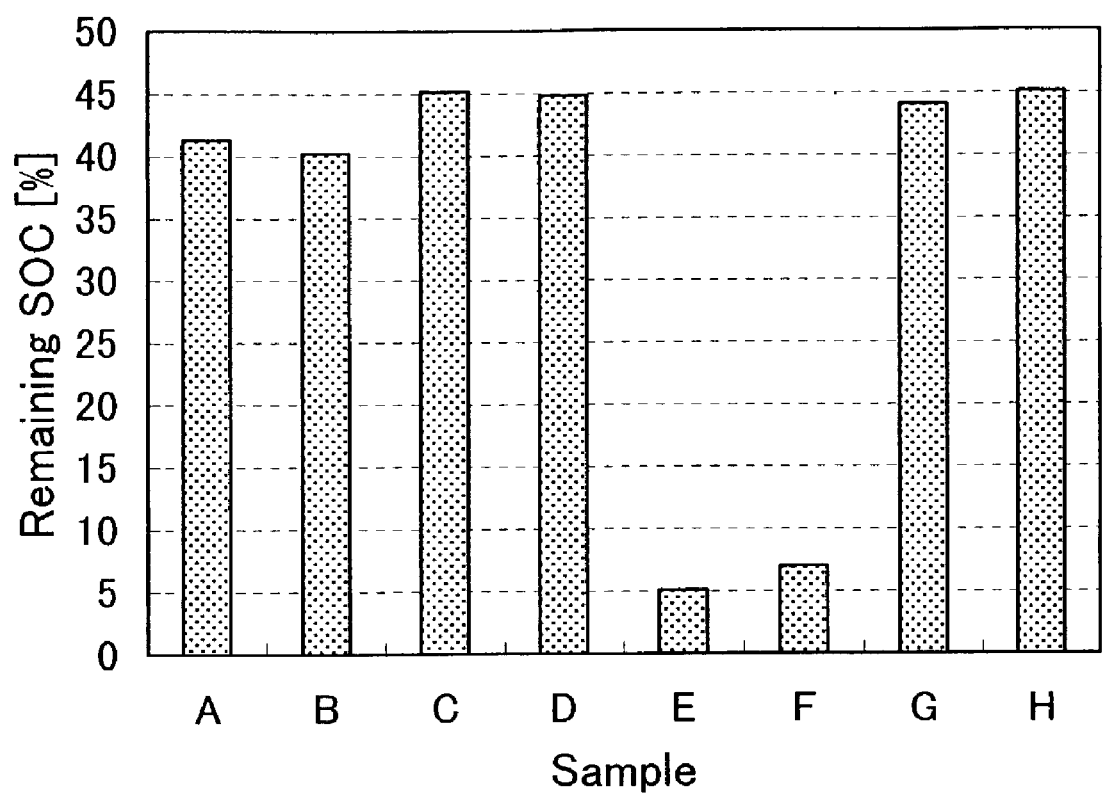
FIG. 2 is a graph showing the measurement results of the self-discharge characteristics of nickel-hydrogen storage batteries with varied amounts of diphenyl carbodiimide.

The self-discharge characteristics were evaluated with respect to each sample of Table 1. More specifically, the battery was charged such that the SOC (state of charge) was 60%, and then was left unused in a 45° C. atmosphere for two weeks, and then the remaining SOC was measured. FIG. 2 shows the measurement results.

As seen from FIG. 2, regardless of the method for providing hydrophilicity, the self-discharge characteristics were improved by letting the amount of the carbodiimide group between the positive electrode and the negative electrode be $1.0 \times 10^{-6}$ mol or more per Ah of the theoretical capacity of the positive electrode. In particular, in the separator that had been subjected to a corona discharge treatment, the self-discharge characteristics were improved significantly by adding diphenyl carbodiimide in the amount of $1.0 \times 10^{-6}$ mol or more per Ah of the theoretical capacity of the positive electrode.

In Example 1, the substance B (second compound) for increasing oxygen overvoltage was not added to the positive electrode, but there is no large influence on the characteristics of the battery in a short period of time.

Example 2

In Example 2, another example of a nickel-hydrogen storage battery that was produced using diphenyl carbodiimide polymer (expressed by chemical formula H—($C_6H_4$—N=C=N—$C_6H_4$)$_n$—H, n=250) as the compound A will be described. In Example 2, batteries were produced using a positive electrode that contains $Y_2O_3$ or a positive electrode that does not contain $Y_2O_3$. Table 2 shows the amount of $Y_2O_3$ added and the method for treating a separator so as to be hydrophilic.

TABLE 2

| Sample | Amount of carbodiimide group added [mol/Ah] | Method for providing hydrophilicity | Amount of $Y_2O_3$ added (X/Y) |
|---|---|---|---|
| I | $1.0 \times 10^{-3}$ | Corona discharge treatment | 0.02 |
| J | | Sulfonation treatment | 0.02 |
| K | | Corona discharge treatment | 0 |
| L | | Sulfonation treatment | 0 |

In Example 2, the positive electrode was produced in the same manner as in Example 1, except for whether the active material paste contains $Y_2O_3$. However, in Example 2, diphenyl carbodiimide polymer was added such that the number of carbodiimide groups per Ah of the theoretical capacity of the positive electrode is $1.0 \times 10^{-3}$ mol. When $Y_2O_3$ is added to the positive electrode, the positive electrode was produced such that the ratio (X/Y) of the amount X (g) of $Y_2O_3$ contained in the positive electrode to the Y (g) of the active material (nickel hydroxide) contained in the positive electrode was 0.02. For the separator, a separator made of a polyolefin resin that had been subjected to a corona discharge treatment or a sulfonation treatment was used. For the other aspects, the same method as in Example 1 was used to produce a nickel-hydrogen storage battery. A battery including a positive electrode containing $Y_2O_3$ and a separator that has been subjected to a corona treatment is denoted by sample I. A battery including a positive electrode containing $Y_2O_3$ and a separator that has been subjected to a sulfonation treatment is denoted by sample J. A battery including a positive electrode that does not contain $Y_2O_3$ and a separator that has been subjected to a corona treatment is denoted by sample K. A battery including a positive electrode that does not contain $Y_2O_3$ and a separator that has been subjected to a sulfonation treatment is denoted by sample L.

Figure 3:
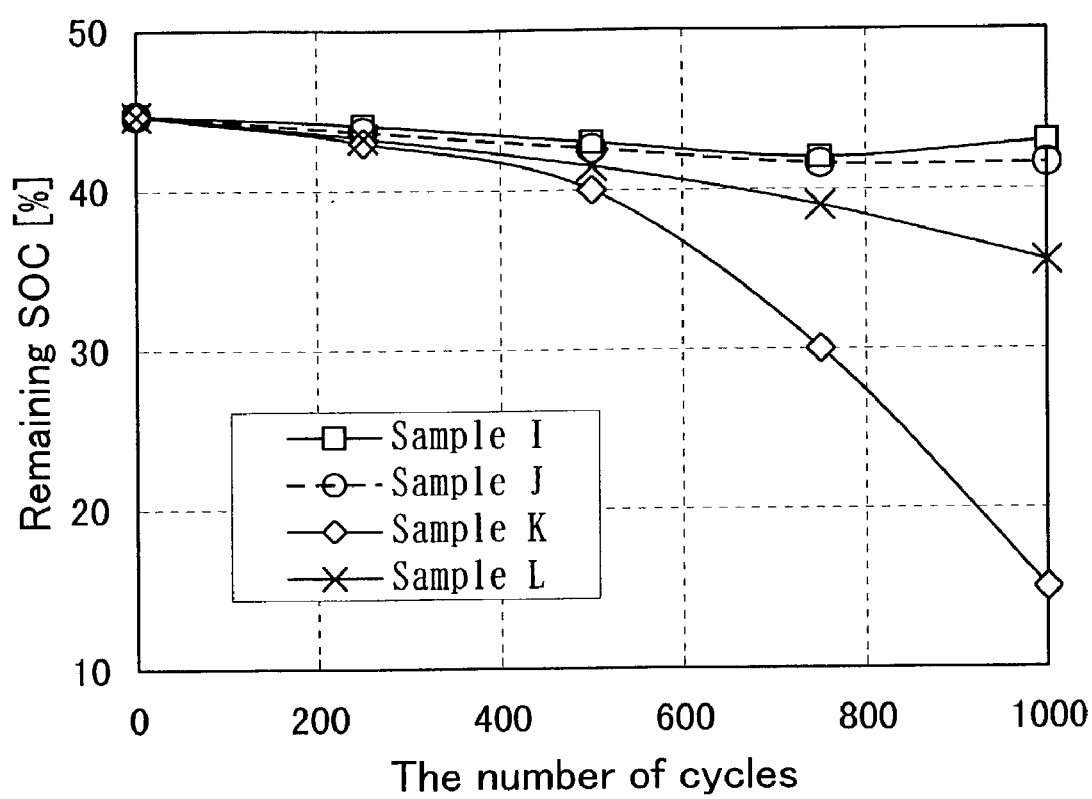
FIG. 3 is a graph showing how the self-discharge characteristics change over charge/discharge cycles in the cases where the positive electrode contains $Y_2O_3$ and does not contain $Y_2O_3$.

With respect to the thus obtained four samples, charge/discharge cycles were conducted and the self-discharge characteristics were evaluated for every predetermined number of cycles. The charge/discharge was conducted by, as one cycle, charging the battery at a current value of 2.5 A and then by discharging the battery at a current value of 2 A. The self-discharge characteristics were evaluated in the same manner as in Example 1. FIG. 3 shows the measurement results.

As seen from FIG. 3, when the corona discharge-treated separator was used, in the sample K using the positive electrode that does not contain $Y_2O_3$, the self-discharge characteristics were reduced significantly over the charge/discharge cycles. This is believed to be because in the case of the compound containing carbodiimide groups, unless an additive having an effect of increasing oxygen overvoltage is added, the carbodiimide groups retaining ammonia are oxidized (poisoned) by oxygen produced at the positive electrode at the time of overcharge. On the other hand, in the sample I containing $Y_2O_3$, the self-discharge characteristics did not deteriorate very much, even after 1000 charge/discharge cycles were conducted. When the sulfonation-treated separator was used, in the sample L that does not contain $Y_2O_3$, the self-discharge characteristics gradually deteriorated over the cycles, compared to the sample J containing $Y_2O_3$. Therefore, it is believed that there is a synergistic effect between the carbodiimide groups and $Y_2O_3$, although the reason for this is not clear.

Example 3

Figure 4:
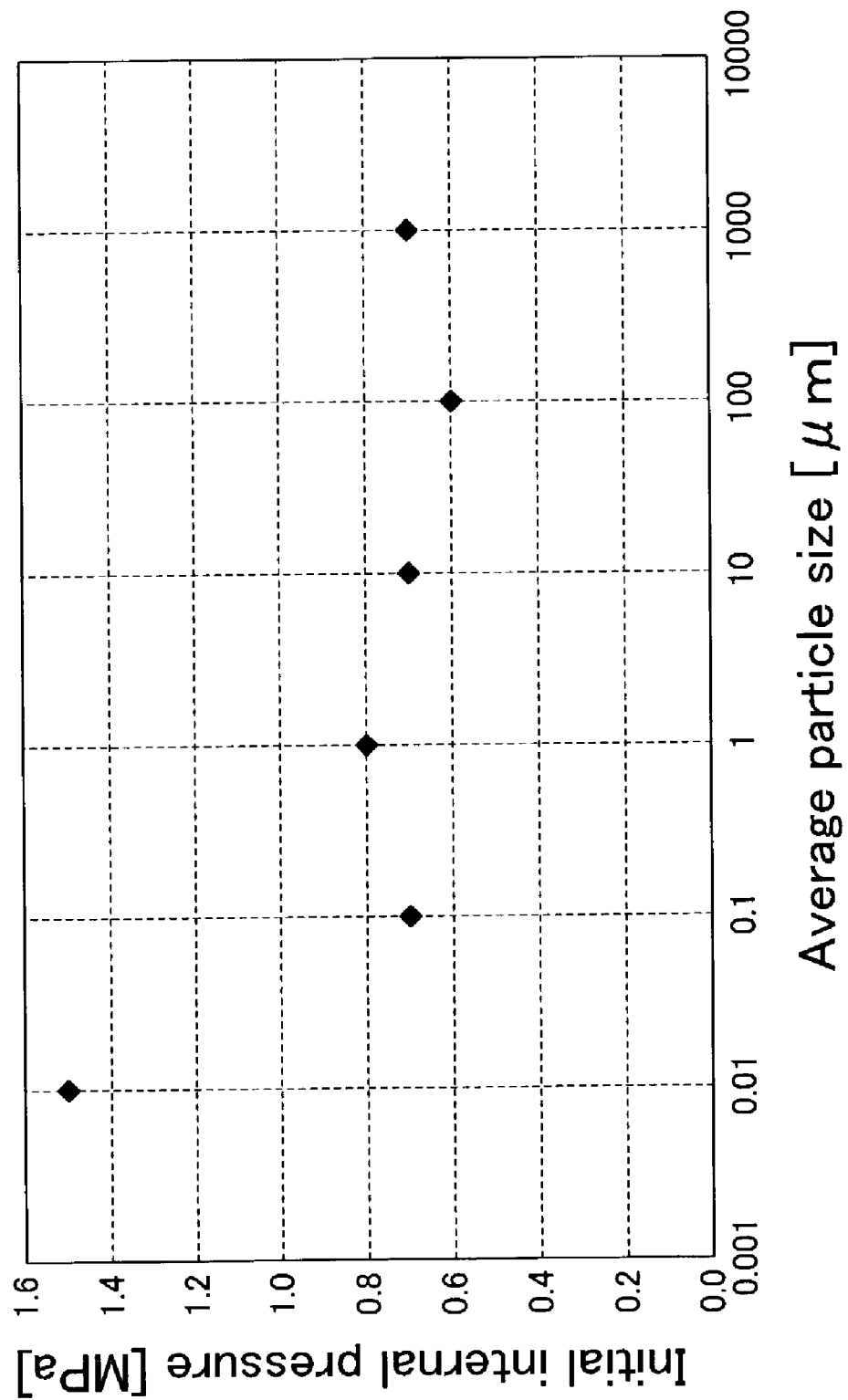
FIG. 4 is a graph showing the relationship between the average particle size of diphenyl carbodiimide polymer and the initial internal pressure in the alkaline storage battery of the present invention.

In Example 3, a plurality of nickel-hydrogen batteries having a difference only in the average particle size of the diphenyl carbodiimide polymer from the sample G of Example 1 were produced. The average particle size of the diphenyl carbodiimide polymer was changed in the range from 0.01 µm to 1000 µm. Then, after each battery was produced, the initial internal pressure of the battery was measured. More specifically, the battery was charged at a current value of 2.5 A at 25° C. for 3 hours and 12 minutes, and the internal pressure of the battery during charging was measured. FIG. 4 shows the relationship between the average particle size of the diphenyl carbodiimide polymer and the largest internal pressure during charging. As seen from FIG. 4, in the case where the average particle size was 0.1 µm or more and 100 µm or less, the largest internal pressure during charging was low.

Figure 5:
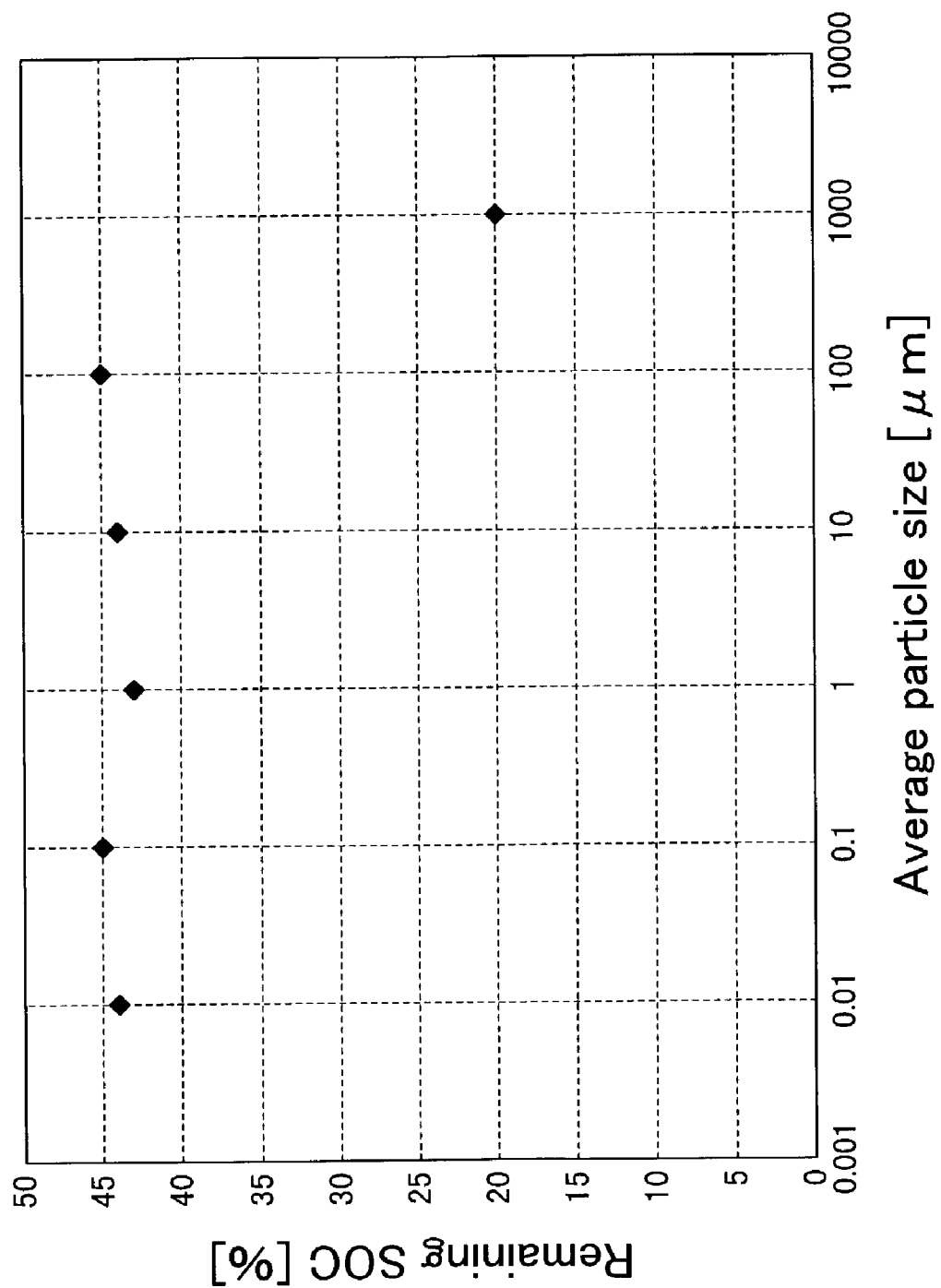
FIG. 5 is a graph showing the relationship between the average particle size of diphenyl carbodiimide polymer and the remaining SOC in the alkaline storage battery of the present invention.

With respect to each sample, the remaining SOC was measured in the same manner of Example 1. FIG. 5 shows the measurement results. As seen from FIG. 5, in the case where the average particle size was 0.01 µm or more and 100 µm or less, the remaining SOC was high.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An alkaline storage battery comprising a positive electrode, a negative electrode, a separator, and an alkaline electrolyte retained in the positive electrode, the negative electrode and the separator, wherein the alkaline storage battery further comprises a first compound for adsorbing ammonia, the ammonia being present between the positive electrode and the negative electrode, and the positive electrode comprises a second compound for increasing oxygen overvoltage at a time of overcharge, wherein the first compound is contained in a form of powder and comprises carbodiimide groups, the second compound is selected from the group consisting of yttrium compounds, indium compounds, antimony compounds, beryllium compounds and ytterbium compounds for anti-oxidation of the carbodiimide groups, wherein an amount X (g) of the second compound contained in the positive electrode and an amount Y (g) of an active material contained in the positive electrode satisfy $0.001 \leq X/Y \leq 0.05$.

2. The alkaline storage battery according to claim 1, wherein the carbodiimide groups are present in an amount of $1.0 \times 10^{-6}$ mol or more per Ah of a theoretical capacity of the positive electrode.

3. The alkaline storage battery according to claim 1, wherein an average particle size of the powder is 0.1 µm or more and 100 µm or less.

4. The alkaline storage battery according to claim 1, wherein the second compound is selected from the group consisting of $Y_2O_3$, $Y(OH)_3$, $In_2O_3$, $In_2O$, $In_2O_3 \cdot H_2O$, $Sb_2O_3$, $Sb_2O_4$, $BeO$, $Be(OH)_2$, $Yb_2O_3$ and $Yb(OH)_3$.

5. The alkaline storage battery according to claim 1, wherein the carbodiimide groups are present in an amount of $1.0 \times 10^{-4}$ mol or more per Ah of a theoretical capacity of the positive electrode.

* * * * *